Jan. 3, 1956   M. W. PACE   2,729,375
EGG TRANSFERRING AND SUPPORTING DEVICE
Filed Aug. 10, 1953
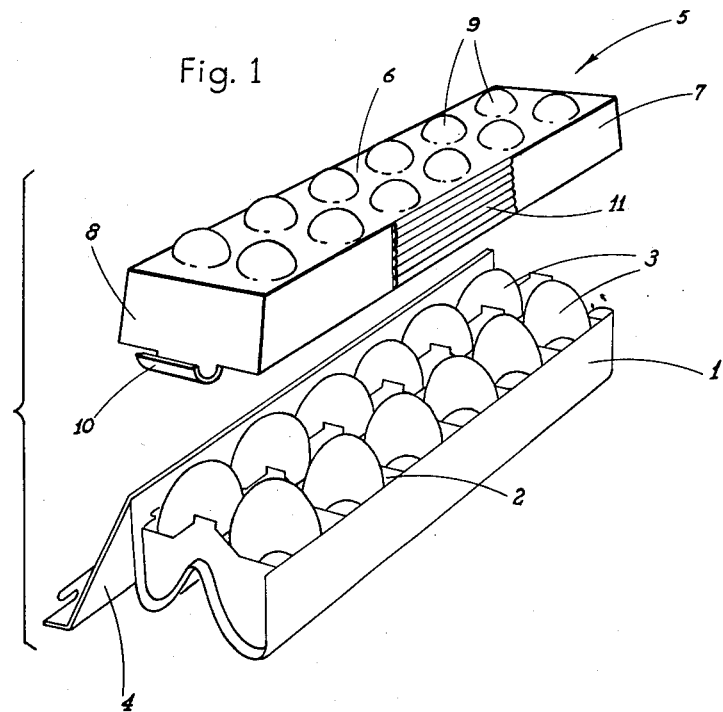
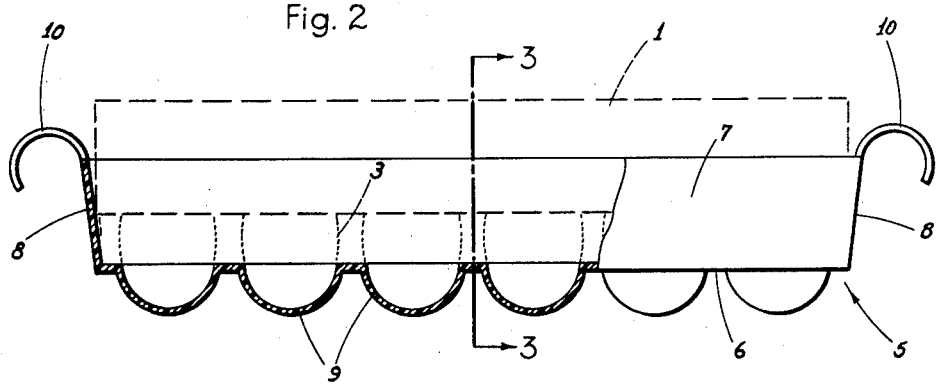
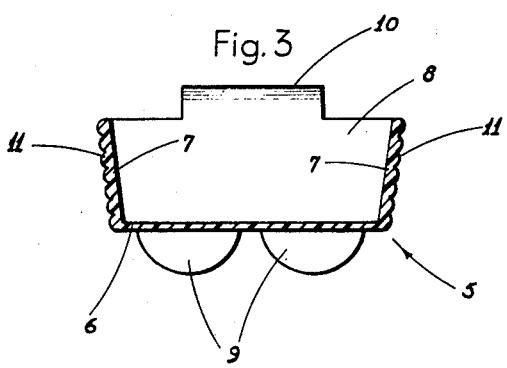
INVENTOR
*Marvin W. Pace*
BY
*ATTYS*

United States Patent Office 2,729,375
Patented Jan. 3, 1956

2,729,375

EGG TRANSFERRING AND SUPPORTING DEVICE

Marvin W. Pace, Yucca Valley, Calif.

Application August 10, 1953, Serial No. 373,086

5 Claims. (Cl. 226—14)

Eggs, for domestic use, are conventionally retailed in cartons which support the eggs in relatively close fitting compartments; it being inconvenient and sometimes difficult to manually lift the eggs one at a time from the carton for use.

The present invention is directed to, and it is a major object to provide, a novel device in the form of a tray-like container arranged so that the eggs from a conventional egg carton may all be transferred simultaneously into such tray-like container and thereafter remain supported in spaced relation therein for storage in a refrigerator, and for easy manual removal.

Another important object of the invention is to provide an egg transferring and supporting device, as in the preceding paragraph, wherein the tray-like container is dimensioned so that it may be inverted and engaged snugly over a conventional carton in which the eggs are merchandised; the container and carton as so engaged then merely being inverted to transfer the eggs from said carton to the container.

An additional object of the invention is to provide an egg transferring and supporting device, as above, wherein the tray-like container is formed, in the bottom thereof, with a pair of side by side rows of recesses; the latter being arranged so that when the egg carton is inverted after initial placement of the tray-like container thereon, the eggs transfer from said carton into related recesses, thereafter remaining supported in the latter in spaced easily accessible relation.

It is also an object of the invention to provide an egg transferring and supporting device which is designed for ease and economy of manufacture; the device preferably being molded in one piece from plastic or the like.

Still another object of the invention is to provide a practical, reliable, and time-saving egg transferring and supporting device, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the egg transferring and supporting device as inverted above an egg carton, but before engagement with the latter.

Fig. 2 is an enlarged side elevation, partly in section, showing the tray-like egg receiving and supporting container in its normal position; the egg carton, as shown in broken lines, being in the position occupied thereby before its removal from said container.

Fig. 3 is a transverse section on line 3—3 of Fig. 2.

Referring now more particularly to the drawings, and to the characters of reference marked thereon, eggs—for domestic use—are conventionally sold in a paperboard carton 1 which is of elongated rectangular configuration in plan, and includes two side by side rows of compartments 2; the latter being formed so that eggs 3 deposited in such compartments are held therein by considerable friction.

The material which forms the compartments 2, together with the frictional hold on the eggs 3 in the carton 1, make it difficult to manually remove the eggs from said carton.

The egg carton 1 includes a lid 4 hinged along one upper longitudinal edge of said carton for folding from a closed position, to an open position, the latter being shown in Fig. 1.

The present device comprises an egg receiving, tray-like container, indicated generally at 5, and which container is elongated and rectangular in plan.

The tray-like container 5 comprises a bottom 6, together with normally upstanding sides 7 and ends 8; such sides and ends being upwardly and outwardly inclined or flared.

The bottom 6 of the tray-like container 5 is formed with two side by side rows of longitudinally spaced pockets or recesses 9 whose open ends are flush with said bottom. These recesses are symmetrical to the compartments 2 in the egg carton 1; i. e., have the same transverse and longitudinal spacing therebetween.

At the ends the tray-like container 5 is formed with outwardly projecting, normally downwardly opening finger grips 10 of substantially semi-circular configuration in end elevation, while the sides 7 are each formed, exteriorly thereof, with a centrally disposed, longitudinally corrugated, finger grip section 11; each section extending from top to bottom of the container.

When the above described device is to be used, the container 5 is first inverted, as in Fig. 1, and is held between the fingers of one hand; the thumb engaging the grip section 11 on one side of the container, while the fingers engage the grip section 11 on the other side.

With the container 5 held in such inverted position, the egg carton 1, with the lid 4 folded down, is held in the other hand; the container 5 then being engaged over the egg carton 1.

The dimensioning of the container 5 is such that it fits snugly over the egg carton 1; such snug engagement being facilitated by the flare of the sides 7 and ends 8.

With the container 5 snugly engaged on the egg carton 1, the eggs 3 therein project in substantially matching relation into the recesses 9, and thereafter the engaged assembly of said container 5 and carton 1 is inverted to the position shown in Fig. 2; the container 5 then being in its normal upright position.

Finally, the egg carton 1 is manually lifted out of the container 5, leaving the eggs 3 seated in the recesses 9 of said container; the latter being stored in a refrigerator, and thereafter serving as the support for the eggs.

With the eggs supported in the recesses 9 of the container 5 they have spacing therebetween both longitudinally and transversely of said container; this feature assuring that the eggs can be individually manually removed from the container with ease.

With the described invention eggs of any size can be simultaneously, safely, and with ease, transferred from any standard two-row carton into the container 5, and thereafter such container provides a convenient and compact means for storage of the eggs in a refrigerator.

Also, with the present invention slightly cracked or soft-shelled eggs are frequently saved from loss, as the eggs need not be firmly gripped—as in the case of the conventional egg carton 1—to remove them from the container 5.

A still further advantage of the device is that, in addition to its convenience of use, it is of a structural form which is not readily subject to damage, and can be washed when necessary; there being no parts subject to wear or requiring dismantling.

From the foregoing description it will be readily seen that there has been produced such a device as will substantially fulfill the objects of the invention, as set forth herein.

While this specification set forths in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. An egg transferring and supporting device for cooperation with an egg carton having symmetrically arranged compartments each holding an egg in upwardly exposed relation, said device comprising a tray-like container having a bottom, sides, and ends, the container normally opening upwardly with said sides and ends upstanding from the bottom, and said container having normally upwardly opening individual egg-seating recesses in the bottom in substantially the same positional relation as the compartments and the eggs in said carton; the container being shaped and dimensioned for cooperative and symmetrical engagement, when inverted, with the egg carton from above, whereby when the assembly of said engaged egg carton and container is inverted to place the latter lowermost and in its normally upwardly opening position, the eggs transfer from said compartments into corresponding recesses of said container.

2. An egg transferring and supporting device, as in claim 1, in which the sides and ends of the container normally flare upwardly and outwardly whereby when the container is inverted and engaged with the egg carton, the latter is engaged within said container.

3. An egg transferring and supporting device, as in claim 1, in which the recesses are substantially semispherical pockets disposed below but opening through said bottom.

4. An egg transferring and supporting device for cooperation with an egg carton having symmetrically arranged compartments each holding an egg in upwardly exposed relation, said device comprising a tray-like container having a bottom, sides, and ends and of a width such that the container may be straddled and grasped by the fingers of a single hand, the container normally opening upwardly with said sides and ends upstanding from the bottom, said container having normally upwardly opening recesses in the bottom in substantially the same positional relation as the compartments and the eggs in said carton, and centrally located finger grips on the sides exteriorly thereof and comprising longitudinally corrugated sections formed in said sides; the container being shaped and dimensioned for cooperative and symmetrical engagement, when inverted, with the egg carton from above, whereby when the assembly of said engaged egg carton and container is inverted to place the latter lowermost and in its normally upwardly opening position, the eggs transfer from said compartments into corresponding recesses of said container.

5. An egg transferring and supporting device for cooperation with an egg carton having symmetrically arranged compartments each holding an egg in upwardly exposed relation, said device comprising a tray-like container having a bottom, sides, and ends, the container normally opening upwardly with said sides and ends upstanding from the bottom, said container having normally upwardly opening recesses in the bottom in substantially the same positional relation as the compartments and the eggs in said carton; the container being shaped and dimensioned for cooperation and symmetrical engagement, when inverted, with the egg carton from above, whereby when the assembly of said engaged egg carton and container is inverted to place the latter lowermost and in its normally upwardly opening position, the eggs transfer from said compartment into corresponding recesses of said container; and finger grips on the ends of the container projecting entirely outwardly relative to the inner faces of said ends.

References Cited in the file of this patent

UNITED STATES PATENTS

| | | |
|---|---|---|
| D. 98,200 | Worthington | Jan. 14, 1936 |
| D. 149,519 | Reynolds | May 4, 1948 |
| 1,874,393 | Vignaux | Aug. 30, 1932 |
| 2,001,045 | Weiss | May 14, 1935 |
| 2,378,628 | Grady | June 19, 1945 |
| 2,535,493 | Gerber | Dec. 26, 1950 |